(12) United States Patent
Bosen

(10) Patent No.: US 6,914,360 B2
(45) Date of Patent: Jul. 5, 2005

(54) TURBOMACHINE

(75) Inventor: Werner Bosen, Köln (DE)

(73) Assignee: Atlas Copco Energas GmbH, Köln (DE)

( * ) Notice: Subject to any disclaimer, the term of this patent is extended or adjusted under 35 U.S.C. 154(b) by 0 days.

(21) Appl. No.: 10/806,791

(22) Filed: Mar. 23, 2004

(65) Prior Publication Data
US 2004/0222716 A1 Nov. 11, 2004

(30) Foreign Application Priority Data
May 10, 2003 (DE) .................................... 103 21 026

(51) Int. Cl.[7] ................................................ H02K 5/16
(52) U.S. Cl. ........................... 310/90; 310/89; 310/261
(58) Field of Search ............................. 310/89–91, 261, 310/268; 290/52

(56) References Cited

U.S. PATENT DOCUMENTS

| | | | | |
|---|---|---|---|---|
| 1,901,154 A | * | 3/1933 | Durdin, Jr. .................... | 417/72 |
| 2,180,168 A | * | 11/1939 | Puffer .......................... | 290/52 |
| 2,508,397 A | * | 5/1950 | Kane ............................. | 290/2 |
| 4,253,031 A | * | 2/1981 | Frister ......................... | 290/52 |
| 4,485,310 A | * | 11/1984 | de Valroger ................. | 290/52 |

* cited by examiner

Primary Examiner—Thanh Lam
(74) Attorney, Agent, or Firm—Collard & Roe, P.C.

(57) ABSTRACT

A turbomachine has at least one rotor disk that is attached at an overhung end of a mounted first shaft, and an electric rotor of an electric machine that is connected with the end of the first shaft that lies opposite the rotor disk, by way of a coupling. The electric rotor is arranged between the first shaft and a second shaft, mounted so as to rotate, which is oriented in alignment with the first shaft, and is also connected with the electric rotor by way of a coupling. The electric rotor is arranged between the couplings as a coupling intermediate piece, without any mounting of its own, and has coupling elements that work together with coupling elements on the shaft ends, without radial play.

6 Claims, 1 Drawing Sheet

TURBOMACHINE

CROSS REFERENCE TO RELATED APPLICATIONS

Applicant claims priority under 35 U.S.C. §119 of German Application No. 103 21 026.1 filed May 10, 2003.

BACKGROUND OF THE INVENTION

1. Field of the Invention

The present invention relates to a turbomachine having at least one rotor disk that is attached at an overhung end of a mounted first shaft, and having an electric rotor of an electric machine that is connected with the end of the first shaft that lies opposite the rotor disk, by way of a coupling.

2. The Prior Art

In the case of the turbomachines known from practice, having the characteristics described initially, the shaft, with the rotor disk attached to it, as well as the electric rotor of the electric machine, are each mounted separately. In this connection, the bearings of the electric machine are arranged on both sides of the electric rotor. There are very great demands on the required production precision of the bearing seats in the housing of the electric machine. These demands become particularly significant when using fast-running high-precision roller bearings or gas bearings, which demand an alignment accuracy of the two bearings relative to one another that lies within extremely close tolerances. Therefore, this known design is very complicated and causes high costs. Furthermore, this alignment accuracy of all of the rotor and housing parts involved is frequently ruined, despite extremely precise production of all the parts involved, in operation, as the result of opposite temperature distortions, since there is a significant heat development in fast-running electric machines.

SUMMARY OF THE INVENTION

Therefore, it is an object of the present invention to provide a turbomachine having the characteristics described initially, whose bearing arrangement is configured more simply, but nevertheless guarantees quiet running at high turbine rotation speeds.

These objects are accomplished, according to the invention, by arranging the electric rotor between the first shaft and a second shaft, mounted so as to rotate, which is oriented in alignment with the first shaft, and is also connected with the electric rotor by way of a coupling. The electric rotor is arranged between the couplings as a coupling intermediate piece, without any mounting of its own, and has coupling elements that work together with coupling elements on the shaft ends, without radial play. Since the electric rotor of the electric machine is supported on the shafts by way of couplings, without any mounting of its own, complicated mounting of the electric rotor of the electric machine is eliminated. As a result, the alignment problems that were described in connection with the mounting of the electric rotor no longer exist. The assembly and alignment of the bearing seats of the turbomachine according to the invention are significantly simplified in this manner.

Preferably, a rotor disk is attached on the end of the second shaft that lies opposite the electric rotor, also in overhung manner. The second stage of the turbomachine requires no additional bearing. As compared with known turbomachines, a clearly simpler bearing arrangement results. The turbomachine according to the invention can be used in flexible manner. Thus, the coupling intermediate piece can be configured as an electric rotor of an electric motor, of a generator, or of a motor/generator alternating machine. The turbomachine according to the invention can therefore be configured, in combination with the electric machine, in one stage or in two stages, in each instance, as a turbocompressor having a motor or as an expansion turbine having a generator. Furthermore, the turbomachine may be equipped with a compressor rotor disk and a turbine rotor disk, in each instance, and be operated with a motor, with excess power on the compressor side, or with a generator, with excess power on the turbine side. In the case of varying excess power, a motor/generator alternating machine can also be used.

Preferably, the couplings are configured as dual-membrane couplings that permit axial equalization. These couplings result in a simple design structure that compensates axial displacement of the electric rotor, e.g. due to heat expansion, at the same time, with a radial arrangement that is free of play. The dual-membrane couplings can be separately balanced with the electric rotor of the electric machine, and are therefore particularly well suited for operation at high speeds of turborotation, up to 50,000 revolutions per minute and more.

Preferably, each shaft, together with its mounting, forms a sealed module. This arrangement allows simple and inexpensive pre-production. In this connection, the mountings of the two shafts each possess at least two bearings, spaced apart from one another, to absorb axial and radial forces. Preferably, the mountings of the shafts have high-precision roller bearings or gas-mounted bearing carriers, which guarantee extremely great running accuracy at comparatively low production expense.

BRIEF DESCRIPTION OF THE DRAWINGS

Other objects and features of the present invention will become apparent from the following detailed description considered in connection with the accompanying drawing. It should be understood, however, that the drawing is designed for the purpose of illustration only and not as a definition of the limits of the invention.

In the drawing,

Figure 1:
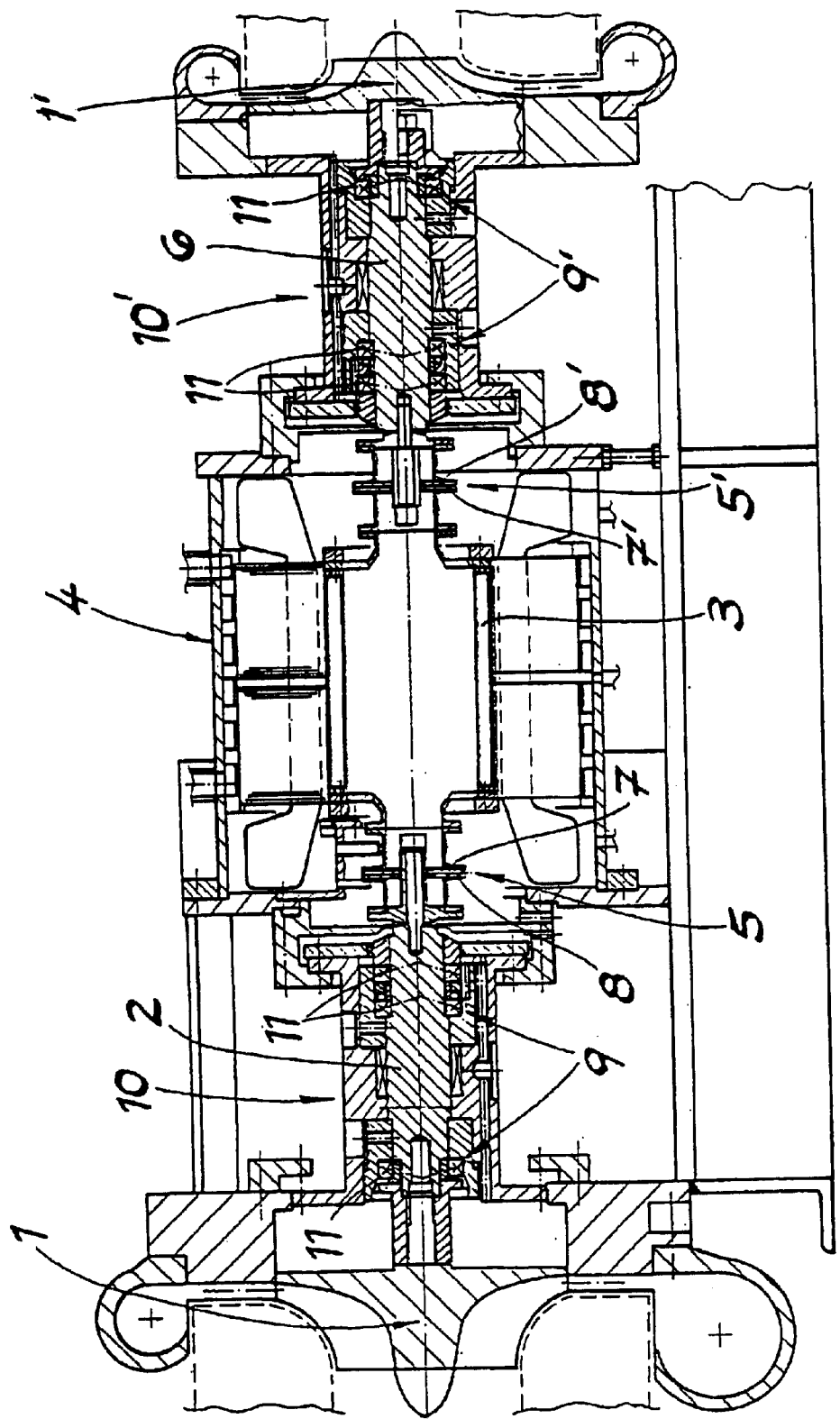

The sole FIGURE, FIG. 1, schematically shows a cross-section through a turbomachine according to the invention.

DETAILED DESCRIPTION OF PREFERRED EMBODIMENTS

The turbomachine shown in FIG. 1 has a rotor disk 1 that is attached at the overhanging end of a mounted first shaft 2. An electric rotor 3 of an electric machine 4, of which only parts are shown, is connected via a coupling 5 to align with the end of first shaft 2 that lies opposite rotor disk 1. Electric rotor 3 is arranged between first shaft 1 and a second shaft 6. Shaft 6 is mounted to rotate and is oriented to align with first shaft 1. Shaft 6 is also connected via a coupling 5' to rotor 3. Electric rotor 3 is arranged between couplings 5, 5' without any mounting of its own, as a coupling intermediate piece, and has coupling elements 7, 7' that work together on the shaft ends without radial play. Coupling elements 7, 7' and coupling elements 8, 8' are connected to rotate with one another, so that rotor 3 and rotor disk 1 are operated at the same speed of rotation. Since rotor 3 is supported on the two shafts 2, 6 by way of the two couplings 5, 5', no separate mounting of electric rotor 3 is required. In this way, the production expense with regard to mounting of the turbomachine is significantly reduced. At the same time, a high level of quiet running can be achieved, at high speeds of turborotation, since the mountings 9, 9' of the two shafts 2, 6 are at a great distance from electric rotor 3, and therefore are only slightly influenced by the heat development of electric rotor 3.

In the exemplary embodiment, a rotor disk 1' is also attached, in overhung manner, at the end of second shaft 6 that lies opposite electric rotor 3. This two-stage embodiment of the turbomachine is characterized, in particular, in that the second stage does not require any additional mounting. As compared to the mountings of two-stage turbomachines that are known from practice, a significant simplification of the bearing arrangement results. The turbomachine can be used in flexible manner, since coupling intermediate piece 3 can be configured as a rotor of an electric motor or of a generator. In combination with the connected electric machine 4, the turbomachine can therefore be operated in two stages, in each instance, either as a turbocompressor having a motor or as an expansion turbine having a generator. There is also the possibility of operating a compressor and a turbine, in each instance, with the two rotor disks 1, 1', whereby electric machine 4 is configured as a motor in the case of excess power on the compressor side, and as a generator in the case of excess power on the turbine side. In the case of varying excess power, coupling intermediate piece 3 can also be configured as an electric rotor 3 of a motor/generator alternating machine.

In the exemplary embodiment, couplings 5, 5' are configured as dual-membrane couplings that permit axial equalization. These couplings 5, 5' have a simple structure. They compensate axial displacements of coupling intermediate piece 3, for example on the basis of heat expansions, and support coupling intermediate piece 3 on the two shafts 2, 6, radially without play. The dual-membrane couplings 5, 5' can be balanced separately, together with the coupling intermediate piece, and are therefore particularly well suited for high speeds of rotation of up to 50,000 revolutions per minute and more. In the exemplary embodiment, each shaft 2,6 together with its mounting 9, 9', forms a sealed module 10, 10'. In this connection, mountings 9, 9' each have three slanted ball bearings 11, spaced apart from one another, to absorb axial and radial forces. Modules 10, 10' allow inexpensive pre-production and thereby simple final assembly of the turbomachine. Slanted ball bearings 11 are each configured as inexpensive high-precision roller bearings.

However, a mounting that uses gas-mounted bearing carriers may also be used.

Accordingly, although only at least one embodiment of the present invention has been shown and described, it is to be understood that many changes and modifications may be made thereunto without departing from the spirit and scope of the invention as defined in the appended claims.

What is claimed is:

1. A turbomachine comprising:
  (a) a mounted first shaft having a first overhanging end and a second opposite end having a first shaft coupling element;
  (b) a rotor disk connected to said first overhanging end;
  (c) a rotatably mounted second shaft aligned with said first shaft and having a second shaft coupling element; and
  (d) an electric machine having an electric rotor arranged between said first shaft and said second shaft, said electric rotor being connected by a first coupling to said second end of said first shaft opposite to said rotor disk and by a second coupling to said second shaft, said electric rotor serving as a coupling intermediate piece arranged without separate mounting between said first and second coupling elements and having first and second rotor coupling elements that cooperate respectively with said first and second shaft coupling elements.

2. The turbomachine according to claim 1, further comprising a second rotor disk connected to an overhanging end of said second shaft opposite to said electric rotor.

3. The turbomachine according to claim 1, wherein said electric machine comprises an electric motor, a generator or a motor/generator alternating machine.

4. The turbomachine according to claim 1, wherein said first and second couplings comprise dual-membrane couplings that permit axial equalization.

5. The turbomachine according to claim 1, wherein said first and second shafts have respective first and second mountings, each shaft and mounting forming a sealed module.

6. The turbomachine according to claim 1, wherein said mountings have high-precision roller bearings or gas-mounted bearing carriers.

* * * * *